(12) United States Patent
Romanek

(10) Patent No.: US 10,132,564 B1
(45) Date of Patent: Nov. 20, 2018

(54) PLANT DRYER WITH IMPROVED CONVECTION FLOW

(71) Applicant: Harvey Romanek, Seminole, FL (US)

(72) Inventor: Harvey Romanek, Seminole, FL (US)

(73) Assignee: THC Therapeutics, Inc.

( * ) Notice: Subject to any disclaimer, the term of this patent is extended or adjusted under 35 U.S.C. 154(b) by 0 days.

(21) Appl. No.: 15/467,722

(22) Filed: Mar. 23, 2017

Related U.S. Application Data

(60) Provisional application No. 62/312,327, filed on Mar. 23, 2016.

(51) Int. Cl.
| F26B 9/00 | (2006.01) |
| F26B 3/04 | (2006.01) |
| F26B 21/00 | (2006.01) |
| F26B 23/06 | (2006.01) |
| A23B 7/02 | (2006.01) |
| A23B 7/005 | (2006.01) |

(52) U.S. Cl.
CPC ............ *F26B 9/003* (2013.01); *A23B 7/0053* (2013.01); *A23B 7/0205* (2013.01); *F26B 3/04* (2013.01); *F26B 21/003* (2013.01); *F26B 23/06* (2013.01); *A23V 2002/00* (2013.01)

(58) Field of Classification Search
CPC .. F26B 9/03; F26B 3/04; F26B 21/003; F26B 23/06; A23B 7/0053; A23B 7/0205; A23V 2002/00
USPC .......................................................... 34/74
See application file for complete search history.

(56) References Cited

U.S. PATENT DOCUMENTS

| 2,082,441 | A | * | 6/1937 | Child ..................... F24F 5/001 62/150 |
| 3,169,497 | A | * | 2/1965 | Blankenship ........ A47K 11/023 4/111.2 |
| 4,189,850 | A | * | 2/1980 | Dieterich ................. A23B 7/02 210/380.1 |
| 4,196,477 | A | * | 4/1980 | Stewart .................. A47K 11/02 4/111.1 |
| 4,205,403 | A | * | 6/1980 | Blankenship ........ A47K 11/023 4/111.1 |
| 5,054,209 | A | * | 10/1991 | Koff ........................ A47J 43/24 210/360.1 |
| 5,261,168 | A | * | 11/1993 | Li ........................... F26B 25/18 34/184 |
| 5,271,161 | A | * | 12/1993 | Brinck, II ................ C12H 1/22 34/105 |
| 5,282,319 | A | * | 2/1994 | Casquilho ............... F26B 25/18 34/318 |
| 5,501,978 | A | * | 3/1996 | Sundberg ............... A47K 11/02 435/290.3 |

(Continued)

FOREIGN PATENT DOCUMENTS

| DE | 3105623 A1 * | 9/1982 | ................ F25C 1/00 |
| JP | 04307010 A  * | 10/1992 | |
| WO | WO 2016089255 A1 * | 6/2016 | ............. B60K 11/00 |

*Primary Examiner* — Stephen M Gravini
(74) *Attorney, Agent, or Firm* — Legends Law Group, PLLC; Stephen H. Bean, Esq.

(57) ABSTRACT

A plant dryer with improved convection flow is provided. The plant dryer has minimal corners in the drying vessel to promote efficient distribution of heated air through the device and to eliminate dead spots within the unit. The plant dryer has additional safety features where, unlike a conventional oven configuration, the unit may not be operated without the drying bowl properly placed within the unit.

20 Claims, 4 Drawing Sheets

(56) References Cited

U.S. PATENT DOCUMENTS

| | | | | |
|---|---|---|---|---|
| 5,572,986 A * | 11/1996 | Eberhardt | F24B 1/1888 126/502 |
| 5,598,641 A * | 2/1997 | Kishi | E03D 5/00 110/238 |
| 5,832,627 A * | 11/1998 | Hiebert | F26B 15/122 34/224 |
| 7,028,415 B2 * | 4/2006 | Heinzen | F26B 5/08 34/312 |
| 7,340,995 B2 * | 3/2008 | Chiang | A23B 7/00 220/23.6 |
| 7,360,321 B2 * | 4/2008 | Su | F26B 9/003 34/90 |
| 7,621,213 B2 * | 11/2009 | Wong | A47J 43/24 34/58 |
| 7,762,006 B2 * | 7/2010 | Kasso | F26B 9/003 34/202 |
| 7,814,678 B2 * | 10/2010 | Romanek | F26B 3/283 34/202 |
| 8,112,900 B2 * | 2/2012 | Romanek | F26B 9/003 34/202 |
| 8,479,746 B1 * | 7/2013 | Tannous | A24F 1/30 131/243 |
| 8,707,576 B2 * | 4/2014 | Lin | F26B 15/04 134/113 |
| 8,851,062 B2 * | 10/2014 | Cedar | F24B 1/182 126/25 B |
| 8,997,371 B2 * | 4/2015 | Bohn | F26B 13/16 162/359.1 |
| 9,357,794 B2 * | 6/2016 | Mastroianni | A23L 1/1812 |
| 9,693,654 B2 * | 7/2017 | Smith | A47J 36/34 |
| 2008/0163764 A1 * | 7/2008 | Payen | A47J 37/043 99/447 |
| 2010/0258109 A1 * | 10/2010 | Foster | A47J 37/1219 126/299 E |
| 2015/0257432 A1 * | 9/2015 | Leavitt | A23L 3/54 34/267 |
| 2016/0223257 A1 * | 8/2016 | Romanek | A23B 7/01 |

* cited by examiner

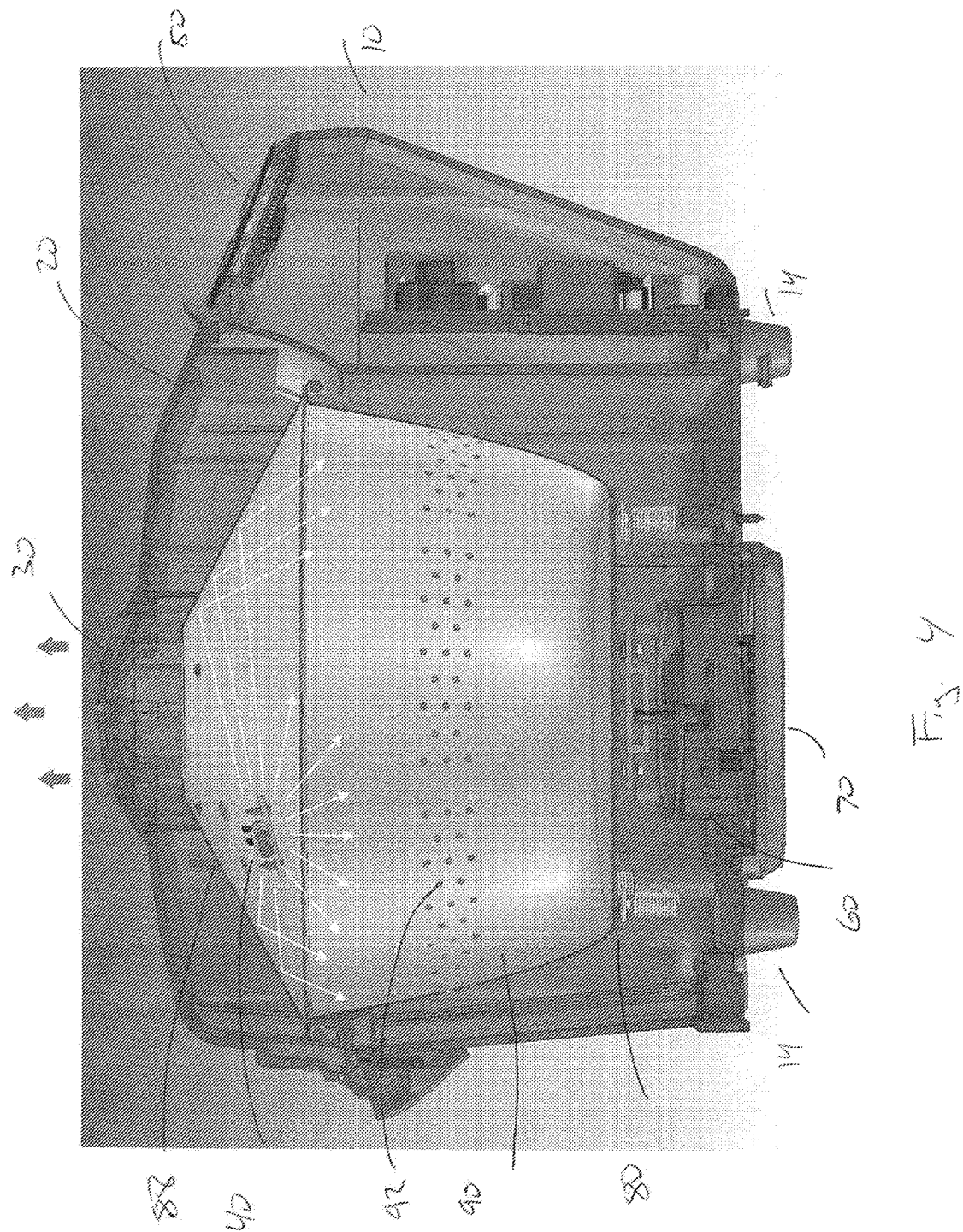

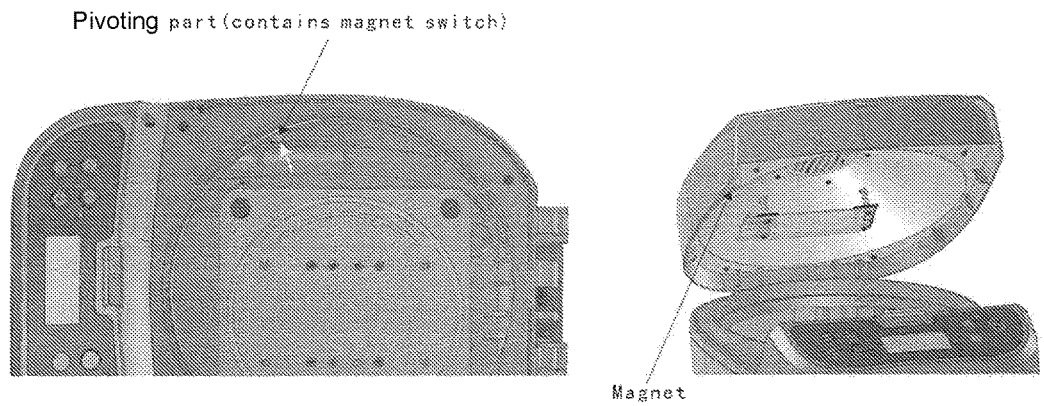
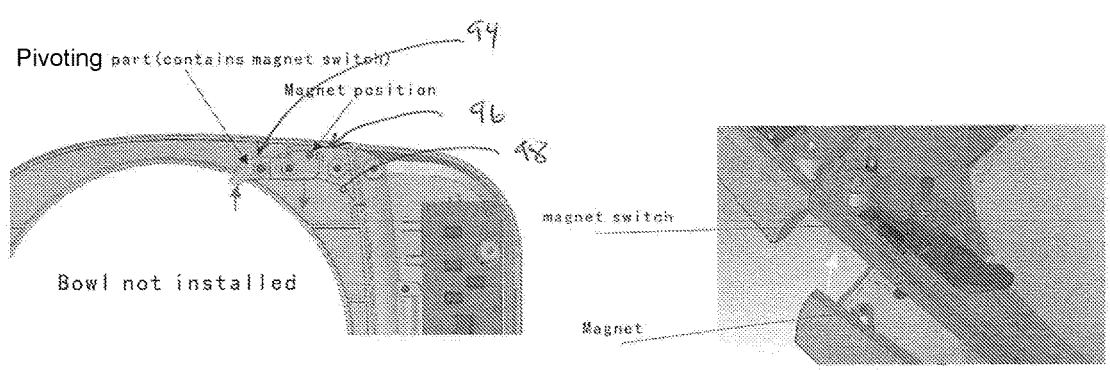
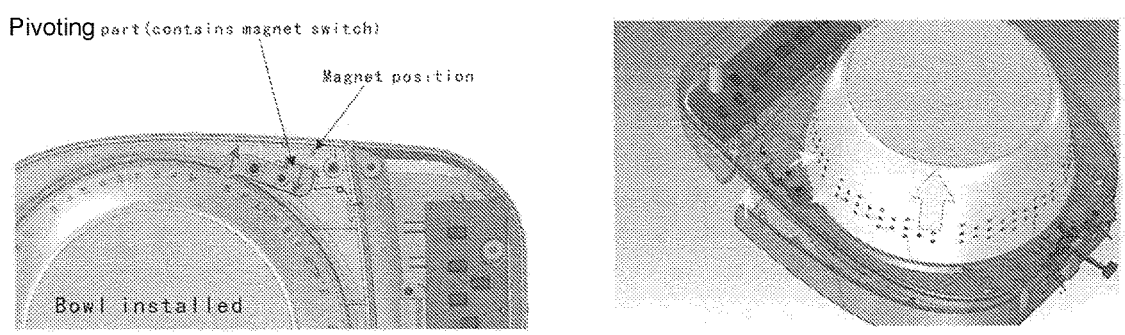
Fig. 5

PLANT DRYER WITH IMPROVED CONVECTION FLOW

FIELD OF THE INVENTION

The present invention relates to a plant dryer that is used to remove moisture and impurities from harvested plant material. The dryer has improved convention flow to facilitate more efficient drying of the harvested plant matter. The field of the invention encompasses plant dryers and plant purifiers, including dryers with temperature ranges sufficient to promote carboxylation of plant matter.

BACKGROUND OF THE INVENTION

In the commercial growing and harvesting of plants, it is often desirable to dry the harvested plant matter and to purify the material from unwanted adulterants. Further, consumers of harvested plant matter may want to selectively reduce moisture content in the harvested plant material, both immediately after harvesting and also after extended storage. Many common herbs and plants are dried before use, including basil (*Ocimum basilicum*), chamomile (*Matricaria recutita*), chives (Allimum *schoenoprasum*), coriander (*Coriandrum sativum*), dill (*Anethum* graveloens), marjoram (*Origanum* marjorana), mints (Menta *piperita*), parsley (Petroselinum crispum and Petroselinum crispum neapolitan), roquette (*Eruca vesicaria sativa*), rosemary (*Rosmarinus officinalis*), sage (*Salvia officinalis*), sorrel (*Rumex acetosa*), tarragon (*Artemisia dracunculus sativa*), and thyme (*Thymus vulgaris*). In addition to herbs, plants used in cooking, home medicines, aromatherapy, and recreational enjoyment often require purification and even slight chemical modification through drying at elevated temperatures.

Plant purification is accomplished through exposing the plant matter to ultra-violet light. Chemical modifications and removal of unwanted moisture is achieved through drying the plant at elevated temperatures and by exposing the plant matter to the flow of warm air during the drying process, otherwise known as convective heat transfer. If the plant matter is not uniformly exposed to the warm air flow, drying times are increased and the process is less predictable and less efficient.

The efficiency of the convection process depends on the configuration of the drying unit. Prior art devices for drying and purifying plant matter suffer from in-artful designs such as blocks, cubes, and other shapes with ninety-degree corners that trap air and form pockets of uneven airflow. In addition, when the interior of the unit is coated with reflective material for ultra-violet light treatment, uniform exposure of the plant matter to the desired light wavelengths is unpredictable because of the complicated reflection patterns caused by the acute angles of the prior art devices.

There exists a need in the art for a plant dryer with improved convection flow. There further exists a need for a plant dryer with uniform reflectivity for application of purifying ultra-violet light to the plant matter. There further exists a need in the art for a plant dryer with improved efficiency in both drying and purifying to reduce the costs of treating plant material.

SUMMARY OF THE INVENTION

The present invention provides a plant dryer with improved convection flow for increased efficiency in drying plants and herbs. The device utilizes a round bowl with mid-height air holes to facilitate efficient drying of the plant matter through a stream of warm air forced across the collection area at the bottom portion of the bowl. The device also offers improved purification treatment of the plant matter through uniform distribution of ultra-violet light within the bowl container. A safety feature is also provided wherein the device may not be operated without proper installation of the bowl.

BRIEF DESCRIPTION OF THE DRAWINGS

FIG. 4 illustrates a cut-away view of the plant dryer of the present invention.

FIG. 5 illustrates a top view of the plant dryer of the present invention, showing the pivoting switch system for improved safety.

Figure 1:
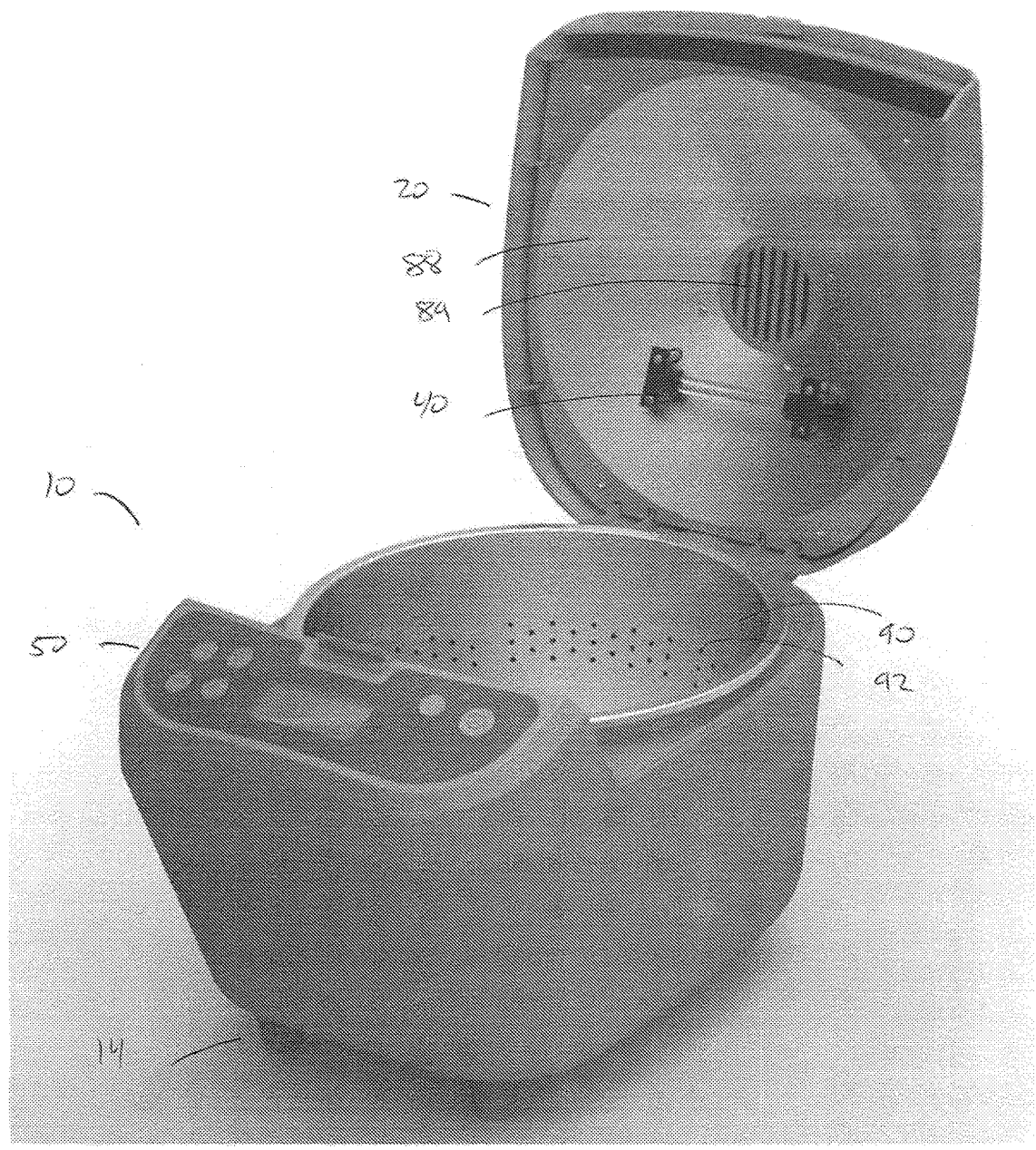
FIG. 1 illustrates a perspective view of the plant dryer of the present invention.
Figure 3:
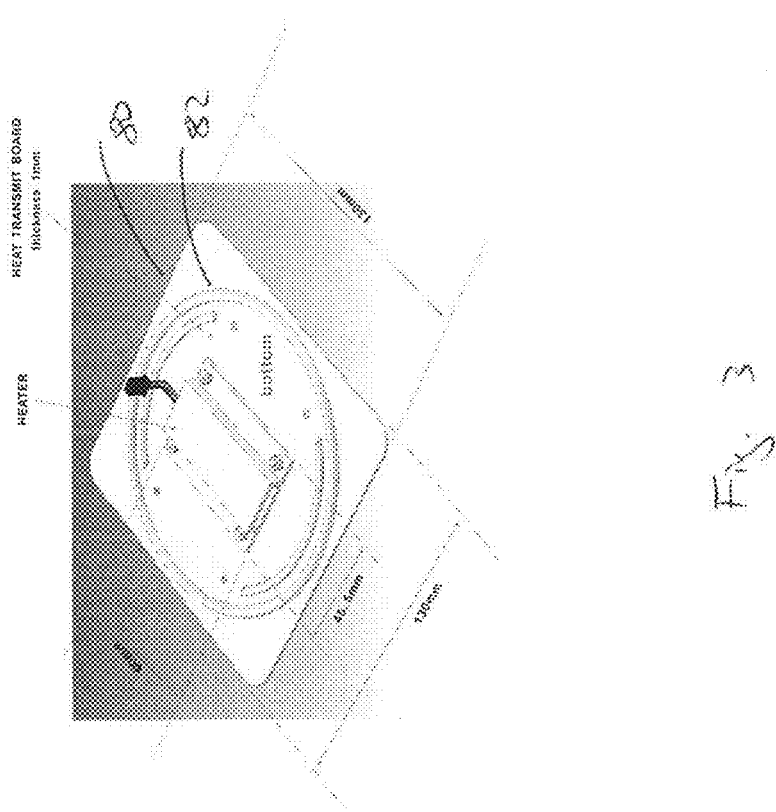
FIG. 3 illustrates a perspective view of the heat transmit board of the present invention.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity.

DETAILED DESCRIPTION OF THE INVENTION

Reference will now be made in detail to the presently preferred embodiments of the invention. There are also representative examples of the invention illustrated in the accompanying drawings. Throughout the following detailed description, the same reference numeral refers to the same elements in all figures.

Figure 2:
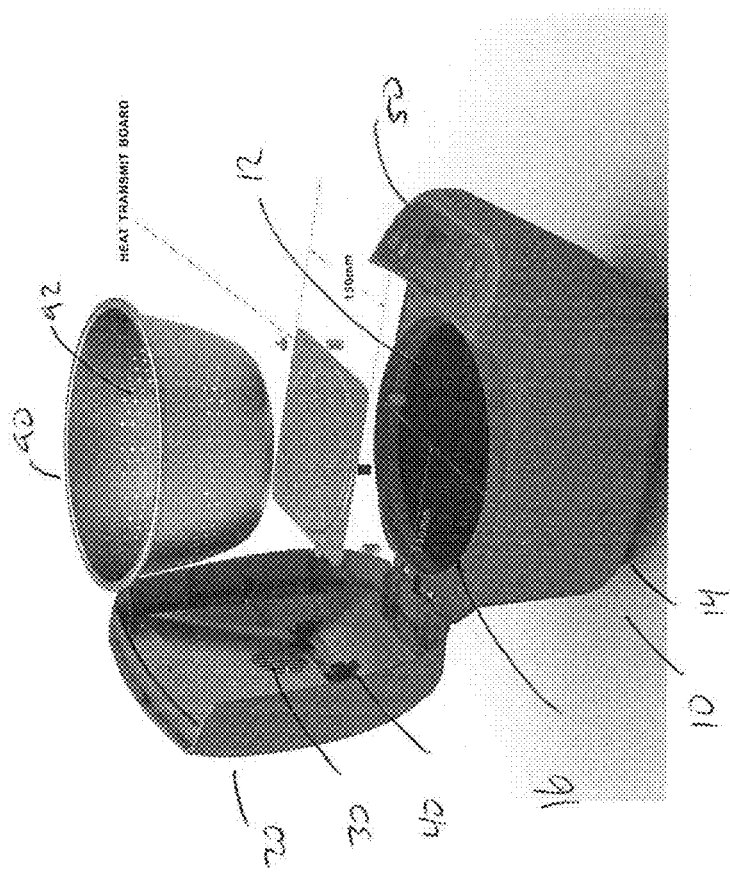
FIG. 2 illustrates a second perspective view of the play dryer of the present invention.

The present invention provides a plant dryer with improved convective flow and improved reflective properties. Referring to FIGS. 1 and 2, and 4, which are perspective and cut-away views of an embodiment of the invention, there is a housing 10 with an interior chamber 12. Support legs 14 support housing 10 and serve to create a space between housing 10 and the surface on which the plant dryer is placed, thereby providing a path for intake air. Support legs 14 may comprise a non-stick surface to prevent the plant dryer from sliding on a support surface. There is a lid 20 that is moveably connected to housing 10 such that the unit can be in either an open or a closed position. Preferably, lid 20 is hingedly connected to housing 10 to prevent the user from inadvertently dropping and damaging the lid. There is at least one intake vent 32 located in a lower region of housing 10 and at least one extake vent 30 located in an upper region of lid 20. Intake vent 32 and extake vent 30 provide entrance and exit points for air to flow through housing 10.

To facilitate convective air flow, the plant dryer of the present invention comprises a fan 60, located in a lower region of housing 10, and a heating element 80. Fan 60 and heating element 80 are both located within interior chamber 12 of housing 10. In a preferred embodiment of the present invention, heating element 80 is a heat transmit board with rigid shape comprising heat coils 82. When connected to a power source, fan 60 draws air into interior chamber 12 through intake vent 32. In yet another embodiment of the invention, there is also provided an intake filter (not shown in the figures) that may be used to clean the incoming air. When connected to a power source, heating element 80 is powered to provide convective heat to the surrounding air. Operating together, fan 60 and heating element 80 serve to draw in and heat a stream of intake air into the plant dryer. Ultimately, this stream of heated air is expelled through extake vent 30 during normal operation of the dryer.

Bowl 90 is an integral part of the plant dryer of the present invention. The bowl is configured to be removable from the plant dryer of the present invention. The bowl shape is particularly conducive to holding plant matter. As the plant matter is dried and moisture evaporated from the material, the weight of the plant matter is reduced. It is not uncommon for fine herbs and plants to be agitated in the flow of air as the weight of the plant matter is reduced. For this reason, a bowl shape is a preferred feature of the present invention as it not only holds the plant matter but also serves to contain herbal dust and prevent the dust from agitational spread throughout the dryer. Further, a round bowl shape avoids the previously mentioned disadvantages arising from the acute corners presently disclosed in the prior art devices wherein the plant matter was not uniformly exposed to the convective air current.

According to the present invention, bowl 90 comprises holes 92 in the sides of the bowl to facilitate airflow from interior chamber 12 through bowl 90 and out extake vent 30. One inventive aspect of the present invention is the placement of holes 92. By placing the holes at a point approximately mid-point on the sides of bowl 90, the containing features of bowl 90 are enhanced while still allowing adequate airflow through the bowl and across the plant matter placed therein. Furthermore, another inventive aspect of the configuration of bowl 90 is the seal between bowl 90 and housing 10. The efficiency of the convective airflow is enhanced by eliminating all pathways where the forced air does not cross the plant matter. According to the present invention, housing 10 comprises annular ring 16 that forms a seal with the top of bowl 90. In this manner, the air forced through interior chamber 12 by fan 60 can escape the unit only by crossing through holes 92 and flowing across the plant matter placed in the bottom portion of bowl 90.

Further, bowl 90 is supported within interior chamber 12 by heating element 80, which is fixedly connected to a bottom portion of housing 10. In a preferred embodiment of the invention, when heating element 80 comprises annular heat coils, the annular heat coils provide even heating for the air flowing upward across the sides of bowl 90. In this fashion, the intake air is drawn into interior chamber 12 by fan 60, is uniformly heated by the annular heat coils of heat element 80, and is then forced across plant matter placed in the bottom portion of bowl 90 after flowing through holes 92. This novel arrangement of elements provides a more efficient heat transfer coefficient between the warm air and the plant matter.

Bowl lid 88 is preferably formed into a convex shape with an annular ring that matches the annular ring of bowl 90. In this manner, bowl lid 88 can form an airtight seal across the top of bowl 90 such that all air flowing through interior chamber 12 must flow through holes 92. In the top of bowl lid 88 there is bowl lid vent 89 which is in communication with extake vent 30. When lid 20 is closed and the unit supplied with power, all air drawn through intake vent 32 by fan 60 must cross the plant matter and then exit through bowl lid vent 89 and extake vent 30. In yet another preferred embodiment of the present invention, the communication between bowl lid vent 89 and extake vent 30 is configured in a non-direct manner such that light cannot escape from the interior of the unit to the exterior of the unit. The same is true for the communication between fan 60 and intake vent 32. By configuring these two paths of communication in a series of indirect flow chambers, the user is protected from any ultra-violet light leakage during operation of the machine.

The plant dryer of the present invention further comprises an ultra-violet light source 40 located within bowl 90 or bowl lid 88. In a preferred embodiment of the present invention, ultra-violet light source 40 is located in the top of bowl lid 88. It is contemplated that bowl 90 and bowl lid 88 may be coated with a reflective material such that ultra-violet light is uniformly reflected within the space created by the joining of bowl 90 and bowl lid 88 when lid 20 is in a closed position. Again, by using a bowl with minimal or, preferably, no corners, the efficiency of the disinfecting aspect of the device is enhanced (see FIG. 4).

The present invention comprises a user interface for selecting and configuring the heating and disinfecting features of the device. Accordingly, control and display features 50 are provided. The combination of control and display features is not limited to the present, immediate disclosures. For instance, it is contemplated in the present invention that both heating and ultra-violet light controls are provided. The controls will communicate with standard electronic components to provide selective settings for the length of time that heating element 80, fan 60, and ultra-violet light source 40 are engaged. Thus, the temperature of interior chamber 12, the amount of ultra-violet light delivered to the plant matter, and the air flow parameters are each selectively controllable. In this manner, plants can be quick dried, gentle dried, and slow-cooked, depending on the desired outcome. Further, it is contemplated that there be a programmable interface feature such that particularized settings can be enabled depending on the type of plant material and the desired production results, such as moisture content, texture, aromatic features, desired carboxylation levels, and other drying parameters known to those in the art. It is further contemplated that the plant dryer of the present invention may be equipped with a dehumidifier unit to further control the end-result of desired moisture content in the plant material. In addition, the unit may have indicator lights to signal power flow to each of fan 60, heating element 80, and ultra-violet light source 40.

The plant dryer of the present invention also comprises certain safety features that provide assurance to the operator that the unit may not be used in an inappropriate fashion. In particular, referring to FIG. 5, a magnetic position switch assembly is provided. The assembly comprises pivot switch 94, magnetic position switch 96, and spring 98. Pivot switch 94 is arranged to be in an extended position through the biasing action of connected spring 98. When extended through the biasing action of spring 98, pivot switch 94 is in an open position such that magnetic position switch 96 is in an open or off position. When bowl 90 is placed within interior chamber 12, the top edge of the bowl will engage with pivot switch 94 to counteract the bias of spring 98 and place magnetic position switch 96 in a closed or off position. In this manner, the circuitry of the plant dryer can be disabled when bowl 90 is not in place and enabled when the opposite is true.

The benefit of the safety feature of the switch assembly is that it prevents the plant dryer from being used without bowl 90 first being inserted into interior chamber 12. If the unit were operated without the bowl, moisture-laden plant matter could clog heating element 80 or fan 60. Furthermore, without the bowl in place, dried plant matter could be blown throughout interior chamber 12 and negatively affect the functionality of the unit. This safety feature prevents improper use of the unit and protects the user from fire or short circuits during prolonged operation when it is not feasible to directly monitor the drying activity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A plant dryer comprising:
    a housing having an interior chamber defined at a top portion by an annular form;
    a lid configured to close over said top portion of said annular form;
    a round bowl having a top portion, a bottom portion, and sides, said bowl sized for placement within said interior chamber and having holes located around the sides of said bowl, said bowl further configured for selective insertion and removal of plant matter therefrom;
    an intake vent, a fan, and a heating element, wherein outside air may be drawn into said interior chamber through said intake vent and may be heated by convective flow across said heating element;
    an exhaust vent in communication with the interior of said bowl;
    wherein when the lid is closed a seal is formed between the bowl and the annular form such that outside air drawn into the interior chamber through the intake vent by the fan may exit the interior chamber only by flowing through the holes located around the sides of the bowl and out the exhaust vent.

2. The plant dryer of claim 1, wherein said lid is connected by a hinge to said housing.

3. The plant dryer of claim 1, wherein said heating element comprises at least one annular heat coil that radiates heat evenly around the bottom portion of said bowl.

4. The plant dryer of claim 1, further comprising an intake air filter.

5. The plant dryer of claim 1, wherein said holes located around the sides of said bowl are located midway between the bottom portion of the bowl and the top portion of the bowl.

6. The plant dryer of claim 1, further comprising a dehumidifier for treating outside air brought in through the intake vent.

7. The plant dryer of claim 1, further comprising a light source wherein said light source emits light upon plant matter placed within said bowl.

8. The plant dryer of claim 7, wherein said lid is connected by a hinge to said housing.

9. The plant dryer of claim 7, wherein said heating element comprises at least one annular heat coil that radiates heat evenly around the bottom portion of said bowl.

10. The plant dryer of claim 7, further comprising an intake air filter.

11. The plant dryer of claim 7, wherein said holes located around the sides of said bowl are located midway between the bottom portion of the bowl and the top portion of the bowl.

12. The plant dryer of claim 7, further comprising a dehumidifier for treating outside air brought in through the intake vent.

13. The plant dryer of claim 7, wherein the intake vent and the exhaust vent comprise indirect flow chambers.

14. The plant dryer of claim 7, further comprising a domed bowl lid disposed within the top portion of the interior chamber, wherein said light source is located inside the domed bowl lid.

15. The plant dryer of claim 7, wherein the bowl and the bowl lid have inside surfaces adapted for reflecting light emitted from the light source.

16. The plant dryer of claim 14, wherein the intake vent and the exhaust vent comprise indirect flow chambers.

17. The plant dryer of claim 1, further comprising a safety mechanism wherein the plant dryer cannot be operated without the bowl.

18. The plant dryer of claim 14, further comprising a safety mechanism wherein the plant dryer cannot be operated without the bowl.

19. The plant dryer of claim 16, further comprising a safety mechanism wherein the plant dryer cannot be operated without the bowl.

20. The plant dryer of claim 19, further comprising an intake air filter.

* * * * *